April 7, 1953     H. E. GRONICH     2,634,246
RESIN FOR WET STRENGTH PAPER AND PROCESS FOR MAKING IT
Filed Nov. 13, 1950
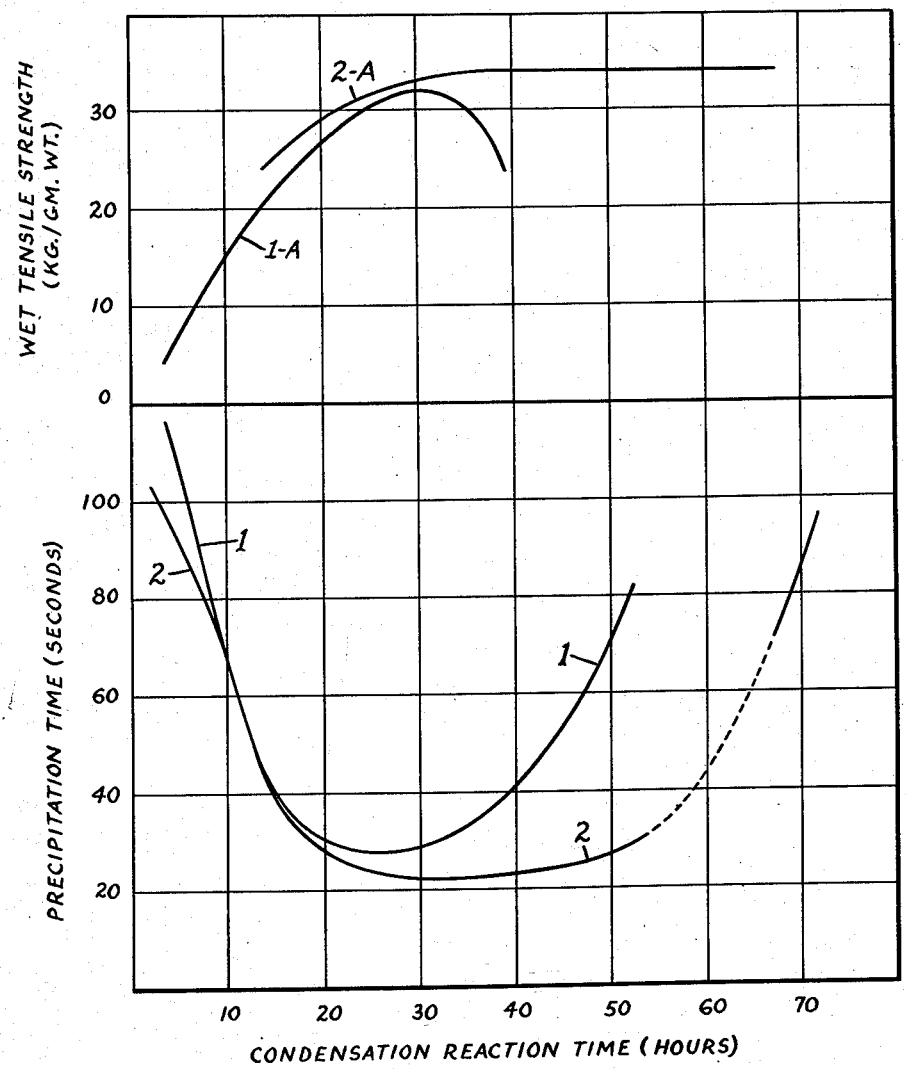
INVENTOR.
HARRY E. GRONICH
BY
Charles W Brown
ATTORNEY.

Patented Apr. 7, 1953

2,634,246

UNITED STATES PATENT OFFICE 2,634,246

RESIN FOR WET STRENGTH PAPER AND PROCESS FOR MAKING IT

Harry E. Gronich, Morristown, N. J., assignor to Allied Chemical & Dye Corporation, New York, N. Y., a corporation of New York Application November 13, 1950, Serial No. 195,423

11 Claims. (Cl. 260—29.4)

This invention relates to a process for the production of an aqueous solution of a urea-formaldehyde condensation product of such character that it is selectively adsorbable from aqueous solution by cellulose fibers, and is particularly suitable for use in treating such fibers which are made into paper, to give a high wet strength to the paper. The invention is particularly directed also to the production of paper by treating the paper fibers with the urea-formaldehyde condensation products produced in accordance with the methods described herein. My invention further extends to the solutions of condensation products produced by my novel process.

Processes for the production of water-soluble urea-formaldehyde condensation products or resins have heretofore been known. It has also been known that by treating slurries of cellulose fibers present in certain stages of the paper making process with solutions of certain of those water-soluble urea-formaldehyde condensation products or resins prepared under carefully controlled conditions, the resin is adsorbed by the cellulose fibers. By heating the paper made from the thus treated fibers to cure the adsorbed resin, both the dry and wet strengths of the paper are increased. The increase in wet strength of the paper is particularly important inasmuch as paper, when wet, ordinarily retains only a very small fraction of its strength when dry.

As is well known in reacting urea and formaldehyde in aqueous solutions to form condensation products thereof, depending upon the reaction conditions water-soluble or crystalline or amorphous, insoluble products are produced. Most of these materials, including many of the water-soluble products, are of no use for the treatment of paper pulps; not being adequately adsorbed by the paper fibers or, if deposited in or on the fibers, not imparting to the final paper product a sufficient increase in dry or wet strength to make the use of those condensation products economic. Furthermore, when solutions of the water-soluble condensation products are stored at atmospheric temperatures, further reactions take place which end with the soluble constituents being converted into insoluble gels or precipitates which are unsatisfactory for the treatment of paper pulps. These reactions occur particularly rapidly when the solutions are acidic during storage. Thus, while the prior art describes a multitude of procedures for the production of various condensation products of urea and formaldehyde, only a very few methods give water-soluble products which are usable for treatment of paper pulp immediately on preparation and still fewer give products with sufficient stability to be stored for any considerable period of time, even when alkaline, without gelation or precipitation.

I have now discovered a new process for the production of aqueous solutions of urea-formaldehyde condensation products or resins having properties which make these solutions peculiarly useful in the treatment of cellulose fibers in paper making to produce high wet strength papers. The character of the solutions produced by my new process with respect to stability over long periods of time at atmospheric temperatures without gelation or other change of the soluble condensation product reducing its desirable properties in making wet strength paper, and the facility of carrying out the condensation reactions and controlling reaction conditions so that products of this desirable character are obtained, are important advantages of my novel process.

I have further discovered a control method by which one may determine the extent to which the condensation reactions of the urea and formaldehyde should be carried to obtain products imparting high wet strengths to paper yet having sufficient stability in aqueous solutions during storage at atmospheric temperatures for it to be practicable to ship the solutions to paper manufacturers for use in their operations. This control method is of wider applicability than to the production of soluble urea-formaldehyde condensates which impart high wet strength to paper by processes carried out under the particular conditions characterizing my invention, although it will be described particularly in conjunction therewith.

In making solutions of urea-formaldehyde condensation products in accordance with my invention, formaldehyde and urea are mixed with each other and are reacted in an acidic, aqueous solution containing a buffer salt. The acidity of the solution in which the urea is mixed with and is initially reacted with the formaldehyde is maintained at hydrogen ion concentrations within the range pH about 6.9 to about 4.5 and thereafter, during the second reaction period (during which condensation reactions occur), is maintained at hydrogen ion concentrations within the range pH 6.5 to about 4.5. The reaction mixture may be made up from an aqueous formaldehyde solution such as the commercial formalin solutions containing about 36–38% (by weight) formaldehyde. Such commercial formalin solutions generally contain methanol, added by the manufacturer to inhibit condensation of the formaldehyde. They also are generally strongly acidic due to the presence of free formic acid. Before mixing the urea with such an acidic formaldehyde solution, the buffer salt is incorporated in the formaldehyde solution and its acidity is brought within the aforesaid pH range. Gaseous formaldehyde may be dissolved in an aqueous solution of the urea, in which case the buffer salt is added to the solution before, during or after the addition of the formaldehyde, but in any case, depending upon the presence of acidic or basic material in the urea solution or formaldehyde gas, before the pH of the solution in which the two materials are mixed would be outside the above range without the presence of the buffer salt and, if necessary, neutralization of part of the acid initially present.

Any of the numerous known buffer salts which maintain aqueous solutions of urea and formaldehyde within the described range of hydrogen ion concentrations are suitable for use in carrying out my process. Among such salts are potassium acid phthalate, dibasic sodium phosphate or sodium hexametaphosphate. When a formaldehyde solution containing about 0.03% or more free formic acid is employed as a starting material of my process, I prefer to use as the buffer salt zinc formate incorporated in the formaldehyde solution by adding to the solution an excess of zinc dust over the amount required to react with the formic acid to form the zinc formate buffer salt. The presence of excess undissolved zinc in contact with the reaction mixture appears to promote formation of a resin product which imparts high wet strengths of paper made from cellulose fibers heated with that product. However, as pointed out below, this excess zinc should not be kept suspended in the reaction mixture. The formaldehyde solution to which the zinc has been added is stirred vigorously to suspend the zinc dust in the solution until it has reacted with a substantial portion of the formic acid present and the hydrogen ion concentration of the solution has decreased to a pH above 4.5, e. g. to about 6.0–6.5 before the urea is added for reaction with the formaldehyde.

Urea amounting to 1 mol for every 1.65 to 3 mols formaldehyde present is incorporated with the formaldehyde solution either as solid urea or as an aqueous urea solution. The amount of water in the reaction mixture is sufficient to dissolve all of the urea at the temperature at which the reaction mixture is maintained during the initial reaction stage as hereinafter described.

The aqueous solution of formaldehyde, urea and buffer salt is subjected to two reaction stages or periods. In the first stage the reaction mixture is maintained at temperatures in the range 10° to 35° C. for a period of at least one hour. There is, however, no precise limitation in the time beyond which the solution should not be maintained at temperatures below 35° C. Holding the solution at these temperatures for one or more days, does no harm. A practical criterion sets the upper limit for the time during which the reaction mixture will be held at the precondensation temperatures for economic plant operation.

During this first, precondensation stage there is an initial reaction of the urea and formaldehyde at the relatively low temperatures. Carrying out this initial reaction under the conditions with respect to temperature and minimum time defined above, is particularly important for obtaining the desired final product of my invention when the mol ratios of the urea and formaldehyde employed are in the range 1 mol urea for every 1.65 to 2.25 mols of formaldehyde. This does not mean that with higher mol ratios of formaldehyde to urea the precondensation stage may be omitted without the character of the final product being deleteriously affected, particularly with respect to its stability during storage. With the higher mol ratios of reactants the minimum time may be a little less than one hour and the desired stable product obtained.

The precondensation reactions of the urea and formaldehyde are exothermic. Depending upon the temperature of the reaction mixture as initially prepared, its concentration and the degree of agitation, the exothermic heat of reaction may be sufficient to heat the reaction mixture to above 35° C. Generally when formalin solutions containing 36–38% formaldehyde or more concentrated formaldehyde solutions and solid urea are used and the reactants at room temperature are mixed with sufficient agitation to quickly dissolve the urea in the formaldehyde solution, with no cooling of the reaction mixture its temperature will rise above 35° C. Whenever necessary to prevent the temperature in this stage of the reaction exceeding 35° C., the reaction mixture is cooled (for example, by heat transfer to a cooling medium) to maintain the temperature within the desired range of 10° to 35° C.

When zinc is added to the formaldehyde solution with strong agitation to suspend it in the solution for reaction with free formic acid therein as described above, after solid urea has been dissolved in the formaldehyde solution or after a solution of urea has been mixed with the aqueous formaldehyde, in stirring the reaction mixture during the precondensation and subsequent condensation reaction period, I have found it important that the rate of stirring should be insufficient to suspend unreacted finely divided zinc present in the reaction mixture. If more than 10 minutes is required for dissolving the urea or mixing a concentrated urea solution with the formaldehyde solution, the stirring of the mixture should be carried out under conditions permitting zinc particles present to settle out of the reaction mixture within a period of 10 minutes from the initial addition of the urea to the formaldehyde solution. In other words, promptly after the urea has been dispersed in the formaldehyde solution or within a period of about 10 minutes after addition of urea to the formaldehyde solution, whichever period is shorter, agitation of the reaction should be insufficient to maintain in suspension any zinc present. A slow stirring is generally desirable during the precondensation and during the following condensation period.

After the reaction mixture has been subjected to the precondensation treatment for at least one hour, it is heated to above 50° C. and is maintained at temperatures in the range above 50° C. to the temperature at which the reaction mixture boils under atmospheric pressure. At these temperatures condensation reactions of the urea and formaldehyde take place. In this second (condensation) stage of my process, the reaction mixture is preferably heated substantially at its boiling point under a reflux condenser which prevents escape of condensible vapors from the reaction mixture.

The reaction mixture is heated at these temperatures above 50° C. for a period of time long enough to carry the condensation reactions to the point at which the desired water-soluble product is obtained; a product which is stable for long periods at atmospheric temperatures, is highly adsorptive by cellulose fibers suspended in water, and after heating paper made from fibers which have adsorbed the resin to cure the resin, the desired high wet strength is imparted to the paper. The period of time required for this second condensation stage differs according to the temperature at which the reaction mixture is maintained, the composition of the reaction mixture, and the conditions for and length of the precondensation period. The following arbitrary test determines the time at which the heating of the reaction mixture is discontinued and it is cooled to atmospheric temperatures:

*Test determining reaction time*

Test samples of 2 cc. of the reaction mixture are taken periodically. Each 2 cc. sample of resin solution is diluted with 20 cc. of 5% sodium chloride solution in distilled water in a 50 cc. test tube 1 inch in diameter. The resin solution and salt solution are mixed thoroughly and the test tube is placed in a water bath at 30°–45° C. To the diluted test solution 1 cc. of concentrated hydrochloric acid (35–37% HCl solution) is added during a period of about one second. The acidified solution is gently agitated in the water bath until a faint turbidity appears when the tube is viewed from the side in diffused light. The time between the addition of the last drop of acid to the diluted test sample and the first appearance therein of a faint turbidity is the precipitation time of this reaction time test.

In reacting urea and formaldehyde in accordance with the processes herein disclosed, by periodically taking samples of the reaction mixture during the condensation step and subjecting them to the above-described test, it will be found that as the condensation time increases the precipitation time of the reaction time test first decreases to a minimum and thereafter, with longer condensation time, increases above this minimum. The accompanying drawing shows curves for these precipitation times vs. condensation times for representative reaction conditions which will be described in detail in specific examples of methods for operating my process. These curves will be more particularly described in conjunction with the examples. It may be noted here that during the initial reaction period the precipitation times show a similar, relatively rapid decrease to a point at which the precipitation time is about that of the minimum time shown on each curve. After passing through this minimum, depending on reaction conditions, the precipitation time may show a substantial increase above the minimum within a relatively short period of time, as in the case of curve 1 of the drawing, or the time curve may pass to and through the minimum and thence to a point at which it shows a substantial increase above the minimum over a relatively longer period of time, as in the case of curve 2 of the drawing.

In reacting urea and formaldehyde under the conditions described above, as the reaction time during the initial stages of the condensation step is increased with decreasing values for the precipitation time of the reaction time test, the wet strength of paper made by treating cellulose fibers with the reaction product increases. The highest wet strengths are obtained employing the reaction products for which the precipitation time of this reaction time test has passed its minimum. However, high wet strengths are obtained using products for which this precipitation time has substantially reached its minimum, i. e. has decreased to within 5–8 seconds of the minimum. Accordingly, in operating the process of my invention, the condensation period is prolonged until the precipitation time of the reaction time test has substantially reached the minimum. After the precipitation time of the reaction time test has passed through its minimum, further prolongation of the condensation reaction time does not greatly improve the wet strengths of papers made with the reaction product. By unduly prolonging the condensation time the wet strengths of the papers are decreased and the stability of aqueous solutions of the urea-formaldehyde reaction product is adversely affected. In general, the reaction time for the condensation step of my process may be twice the time required for the reaction product to attain the minimum precipitation time of the reaction time test, and in some cases three times the time required to attain this minimum, without undue adverse effects on the wet strength of papers made from the reaction product or the stability during storage of the solutions. On the other hand, no advantage is gained by prolonging the condensation time beyond that required for the product to attain the minimum precipitation time of the reaction time test, and prolonging it for a period greater than 1½ times that required to attain this minimum precipitation time of the reaction time test substantially increases the cost of preparing the reaction product of urea and formaldehyde by the process of my invention. Furthermore, in some cases, such as typified by curves 1 and 1-A of the drawing, by prolonging the condensation reaction time until the precipitation time has risen substantially above its minimum there is a decrease in the wet strengths of the papers. Accordingly, in carrying out my process I maintain the reaction mixture during the second stage under the above-described conditions promoting condensation of the reactants until the precipitation time of the reaction time test for the reaction mixure substantially attains a minimum, and I discontinue the heating of the reaction mixture and cool it to atmospheric temperatures (to temperatures below about 30° C.) before the precipitation time has risen substantially above its minimum; i. e., before it has risen more than 5–8 seconds above its minimum. In general, this entails cooling the reaction mixture to atmospheric temperatures within a period of time which does not exceed 2–3 times, preferably no longer than 1½ times the time required to attain the minimum precipitation time.

The reaction time test described above permits determination of the condensation reaction period for any given set of reaction conditions. When a procedure has been established for carrying out the reaction under given conditions and the precipitation times thus determined, in duplicating that procedure it is, of course, no longer necessary to make the described tests in each instance. The period allowed for condensation is timed in accordance with the tests previously made on a reaction mixture prepared in the same manner and maintained under the same reaction conditions and the condensation reaction is arrested when the precipitation time of the reaction time test is substantially at its minimum value for that reaction mixture.

The second condensation step of my process is preferably carried out by heating the reaction mixture substantially at its boiling point under atmospheric pressure in a vessel provided with a water cooled reflux condenser in which vapors escaping from the solution are cooled and the condensible constituents are returned to the reaction mixture. Employing this method the reaction mixture is heated at temperatures of the order of 85° C. to 100° C., its boiling point within this range depending principally on its content of methanol.

During the reaction of the urea and formaldehyde the acidity of the reaction mixture usually changes. For example, a reaction mixture prepared in accordance with my invention having a pH 5.95 immediately following addition of the urea to the formaldehyde solution and maintained for three hours at about 25° C. showed an increase in pH to 6.52 after two hours. Immediately upon starting to heat it the pH quickly fell from 6.50 to about 5. As heating of the reaction mixture at 87° C. was prolonged the pH drifted downwardly from 5 to 4.6 at the end of about 19 hours heating at that temperature.

As pointed out heretofore, in carrying out the process of my invention the preliminary reaction of the urea and formaldehyde in the first step of my process is in a reaction mixture maintained at hydrogen ion concentrations within the range pH 6.9 to about 4.5. When a solution has an acidity of pH 6.5 to 6.9 at the end of the first step, upon heating to the more elevated temperatures above 50° C. at which the second step is carried out, the pH quickly falls to 6.5 or lower; to within the range 6.5 to 4.5 which is required for the second step. Whenever necessary to bring the acidity of the solution within this required range, more acidic buffer salt or an acid is added to the solution produced by the first step when it is heated to the higher temperatures at which the second step is carried out. When in either step the hydrogen ion concentration of a reaction mixture tends to increase or decrease substantially above or below the described limits, it is brought within those limits either by addition of more buffer salt or of an acid or base.

Solutions of condensation product prepared in the manner described above are separated from any undissolved zinc present by filtration or decantation. The solutions are stable for long periods of time at atmospheric temperatures without gelation or deposition of solids therefrom and are thus suitable for production and marketing for use in paper manufacture. The stability of the solutions may be increased whenever desired by adding an alkali, such as sodium hydroxide, to neutralize the free acidity of the solution and to reduce its hydrogen ion concentration to a pH of 7 to 7.5. Without neutralization, solutions prepared by the procedure described have storage lives of more than a week even with the minimum mol ratio of 1.65:1 formaldehyde to urea being used in their preparation. With my preferred mol ratios of 2:1 or greater they have storage lives of one month or more. By neutralizing the solutions, the storage lives of products prepared from 1.65:1 mol ratios of formaldehyde to urea are increased to about two months and the storage lives of products prepared from higher mol ratios of formaldehyde to urea of 2:1 or greater are much longer.

As described above, maintaining the acidic reaction mixture at high temperatures (about 50° C.) for long periods of time after passing its minimum precipitation time will result in decreasing the stability of the reaction product, in little increase in the strength of paper prepared from fibers treated with the product, and finally in forming products which are not clear solutions or which impart less increase to the strength of the paper than products made with shorter condensation times. I have discovered, however, that by storing the acidic condensation reaction product at atmospheric temperatures for a period of time, this aging of the solution results in substantial increases in the wet strength of paper prepared from fibers treated with such aged solutions. By limiting the aging time for the acidic solutions so that they still show a precipitation time of at least 10 seconds by the above described reaction time test, the acidic solutions with a pH range of 6 to below 7 still have a reasonable storage life for it to be practicable to use them in the manufacture of wet strength paper. By neutralizing the aged solutions while they still have a precipitation time of at least 10 seconds, their stability is increased and the time during which they may be held further at atmospheric temperatures before use in paper production is substantially longer.

In employing this aging step as a part of a preferred process within the scope of my invention, the high temperature condensation step of the process described above is carried to a point at which the precipitation time of the product has approached close to but is still not at or has still not passed through its minimum. For such reaction products the atmospheric temperature storage or aging of the products at acidities in the range of pH of about 6 to below 7 is advantageously of about one month duration. The aged solution is then neutralized to a pH of 7.0–7.5 before being shipped to the paper manufacturer.

When the reaction mixture treated by my process contains large proportions of water, as when aqueous solutions of formaldehyde containing major amounts of water such as the commercial 37% by weight formaldehyde solutions are employed in making up the reaction mixture, it may be and frequently is desirable to eliminate at least a part of this water so that the final product will contain a relatively high concentration of solids. I have discovered that by neutralizing the acidity of the reaction product of the high temperature condensation stage of the process described above, the neutralized aqueous products having acidities in the range pH 7.0 to 7.5 can be boiled to evaporate water therefrom at atmospheric pressure without seriously impairing the storage life during which the product solution can be held without gelling or precipitation, and without substantially decreasing the wet strength imparted to paper by treatment with the concentrated product. This is an important feature of my invention when it is desired to employ relatively dilute solutions of formaldehyde or solutions of urea in making up the reaction mixtures and yet obtain products with relatively high concentrations of solids.

In evaporating water from the reaction products at atmospheric pressure the hydrogen ion concentration usually increases as the evaporation is prolonged. So long as the pH is in the range 7.0 to 7.5 the amount of water evaporated or the time required for the evaporation at the boiling point of the solution is not critical. However, when the product solution neutralized to 7.0–7.5 is evaporated far enough for the pH of the solution to drift below 7.0 downwardly to 6.0, the desired quantity of water should be evaporated from the solution sufficiently rapidly so that the solution having acidities in this range of 6.0 to below 7.0 is heated to evaporate it for a period no longer than two hours. A preferred procedure for preparing products in accordance with my invention is to neutralize a reaction mixture prepared from a dilute formaldehyde solution and urea to a pH of 7.0–7.5, evaporate under atmospheric pressure the neutralized solution to a solids content of about 45% for a period no longer than two hours, during which the pH drifts downwardly into the acid range of pH 6.0–6.5, and then aging the solution as described above before adding an alkaline material to increase its pH to 7.0–7.5.

Methanol may be incorporated in the solution of reaction product prepared in any of the foregoing manners further to increase the storage life of the solution. This may be done either by adding methanol to the reaction product or by including methanol in the initial reaction mixture. About 2½% or more methanol by weight of the reaction product is sufficient to materially increase the storage life. I prefer to have the product contain about 5% methanol and practical considerations of the cost of added methanol and dilution of the reaction product will limit the methanol addition to a minor amount, not greatly exceeding this preferred 5%. When the methanol is incorporated in the product by being introduced into the initial reaction mixture, somewhat more methanol than 2½% by weight of the reaction mixture should be provided to compensate for any methanol losses during the treatment of the reaction mixture. The commercial "inhibited" formalin solutions on the market usually contain about 6% to 13% methanol to serve as a preservative for the formaldehyde solution during shipment and storage. In general, this quantity of methanol in the formaldehyde solution used for making up the reaction mixture will result in the reaction product containing an adequate methanol concentration without the addition of more methanol to that product.

In employing the solutions of urea-formaldehyde condensation products prepared by the procedures described herein to make high wet strength paper, the solution is added to a water suspension of cellulose fibers which, either before or after the addition of the resin is made acidic by addition of an acid or acidic material such as the alum commonly added to the pulp slurries in paper making processes. Thus, the resin solution may be added to the fiber suspension in the beater or head box commonly employed in paper manufacture. The amount of resin solution used is determined by the properties to be imparted to the paper; more or less resin solution being used, depending upon economics and the increase in wet or dry strength desired for the paper. The urea-formaldehyde condensate is preferentially adsorbed from solution by the cellulose fibers. Addition to the fiber suspension of resin solution containing a fraction of a percent up to 2½% by weight of solids content of the solution based on the dry weight of the cellulose fibers present, increases sharply the wet strength of the resulting paper. In general, however, further increases above 2½% in the amount of urea-formaldehyde resin added do not give comparable increases in the wet strength of the paper product. In addition to the more important consideration of increase in wet strength of the paper, the addition of the resin also increases materially the dry strength of paper.

The effectiveness of the resin in improving wet strength of paper is cut down when the water in the suspension of cellulose fibers has a high bicarbonate content, e. g. of around 100 P. P. M. or more. When the water available to the paper manufacturer has a hardness of this nature, addition of a water softening agent, such as sodium hexametaphosphate, will obviate this reduction in effectiveness of the treatment of the fibers with the solutions of ureaformaldehyde resin. Instead of reducing the hardness of the water, adding to it an acid or acidic material in amount sufficient to increase its hydrogen ion concentration to a pH of about 4.0 to about 4.2 will also restore the effectiveness of the resin solution in increasing the wet strength of the paper.

The fiber pulp containing the adsorbed urea-formaldehyde condensation product is sheeted by the usual methods employed by paper manufacturers. The paper is dried and heated to cure the resin. The time required for adequate curing of the resin decreases as the temperature of heating is increased. Adequate rates of curing are obtained by heating the paper at temperatures in the range 100° to 150° C.

The following examples more particularly illustrate my process for the production of solutions of ureaformaldehyde condensation products. In employing the product solutions of these examples for making paper, Kraft pulp was beaten with water to form a slurry to which the resin solution was added in amount providing 2½% of resin by weight of dry pulp. The slurry was agitated 15 minutes and a 10% solution of paper-maker's alum added to lower the pH of the slurry to about 4.5. After a further agitation for 5 minutes the pulp slurry was made into sheets of paper which were dried at 60° C. and then cured at 130° C. for 5 minutes under pressure. Samples of paper thus prepared and paper prepared in the same manner except for no resin solution being added to the pulp slurry were conditioned 24 hours at 75° F. and 50% relative humidity and then tested for dry and wet tensile strengths. The tensile strength tests were made on a Scott I. P.–4, inclined plane constant rate of load machine, using ½" wide samples both for wet and dry tests. The test data are given in terms of kg./gm. wt. of a strip of paper 10 cm. long and ½" wide. For wet strength test ½" sample strips were soaked 60 seconds in distilled water, then placed between two blotters. A steel cylinder 3" long weighing 3 kg. was rolled across the blotters and test strip under its own weight and the paper strip was tested immediately.

For comparison with the values given in the following examples for the wet strengths of papers made in the manner described, the wet tensile strengths of paper prepared in the same manner except that no ureaformaldehyde reaction product was added to the pulp slurry, were 3½–5 kg./gm. wt.

*Example 1.*—Into a vessel equipped with an agitator and a reflux condenser, 761 parts of 35.5% commercial formaldehyde solution containing 10–11% methanol and .03% formic acid was charged. To this was added 0.32 part zinc dust, and the solution was strongly agitated until the pH increased to 6.0. There was then added 216 parts of solid urea, with strong agitation to obtain rapid solution of the urea. This corresponded to a ratio of 2.5 mols formaldehyde for every 1 mol urea. When the urea had dissolved the agitation was slowed down and the reaction mixture was stirred slowly at 35° C. for three hours. Following this precondensation period the reaction mixture was heated to its boiling point over a period of 35 minutes and was boiled with reflux of the evolved vapors. Periodically samples of the reaction mixture were taken and subjected to the above described reaction time test. In the accompanying drawing, curve 1 shows the change in precipitation time for these samples with increase in the time the reaction mixture was heated a 87° C. During this condensation reaction period the pH of the reaction mixture slowly drifted downwardly from about 5.6 at the start to about 5.0 after twenty hours of heating. Thereafter it underwent little further decrease, the pH remaining above pH 4.5 throughout the condensation reaction period.

In duplicating the procedure of this example, periodic samples of the reaction mixture were withdrawn and employed in the preparation of paper by the procedure described above. Curve 1-A shows the change in wet tensile strength in kg./gm. wt. for papers thus produced employing resin solutions prepared with varying condensation reaction times and resulting changes in precipitation time of the reaction time test which are shown by curve 1.

It will be noted that the wet tensile strengths of the paper increased rapidly with the condensation time up to about 18 hours, corresponding to the rapid decrease in precipitation time. Thereafter the wet strength of the paper showed a much smaller further increase as the precipitation time further decreased to a minimum and then rose somewhat above that minimum at about 35 hours condensation time. But with longer condensation reaction times, greater than 35 hours, the wet strength of the paper began to decrease rapidly below that for the reaction product characterized by having a precipitation time substantially that of the minimum shown by curve 1; i. e., precipitation times of about 26 to 34 seconds, corresponding to condensation times of about 18 to 35 hours. Accordingly, in employing the process of this example for the production of a urea-formaldehyde reaction product which is employed for treating paper to make a high wet strength product, the condensation is interrupted within the period of 18 to 35 hours, preferably 25 to 35 hours, by cooling the reaction mixture.

The solutions of urea-formaldehyde reaction products prepared in this manner were found stable when stored at atmospheric temperatures over a period of two months.

*Example 2.*—The procedure for reacting urea and formaldehyde of Example 1 above was employed using a commercial 35.5% formaldehyde solution containing 9.3% methanol and heating this formaldehyde solution with the zinc dust until the pH of the solution had been increased to 6.4. During the condensation reaction period the pH remained in the range 4.7-5.0. Curve 2 of the drawing shows the precipitation time for reaction product samples taken at varying times of the condensation reaction step during which the reaction mixture was heated at 87° C. Curve 2-A shows the change in wet tensile strength of papers made employing the reaction products obtained at the different reaction times.

Again, as in the case of the curves for Example 1, it will be noted that up to a condensation time of about 18 hours the precipitation time rapidly decreased, after which it more gradually decreased to pass through a minimum at about 28 hours, and then slowly increased up to about 50 hours. With still longer reaction time there was an accelerated increase in the precipitation time. Curve 2-A shows an initial rapid increase in the wet strength of paper prepared from the reaction products up to about 18 hours condensation reaction time. This was followed by a progressive but much slower increase in wet strength of the paper with more prolonged condensation times up to about 35 hours, corresponding to the period of reaction during which the precipitation time is passing through its minimum of about 22 seconds. With longer condensation reaction times there was no sharp decrease in the wet strengths of the paper prepared from reaction products formed under the conditions of this example. There was, on the other hand, no substantial further increase in these wet strengths.

In preparing products for use in making wet strength paper by the procedure of this example, the condensation step during which the reaction mixture is heated at 87° C. is prolonged for about 18 hours, but the reaction mixture is cooled after it has been heated for from 18 to 50 hours, preferably about 20 to 30 hours, and the product thus obtained is employed in the manner heretofore described for the production of high wet strength paper. Without neutralization, products prepared under the conditions of this example were stable during storage for about 3 months at atmospheric temperatures. By neutralizing the acidity of the products with caustic soda they remained stable for periods of 1½ years or more.

*Example 3.*—About 1500 parts of a 35.9% formaldehyde solution containing 10% methanol are charged to a reactor equipped with an agitator and reflux condenser, and 0.64 part zinc dust added. The mixture is strongly agitated until the pH of the formaldehyde solution has been increased to 6.1 from its initial value of 3.2. There is then added 432 parts urea over a period of 3 minutes and the solid urea is dissolved in the solution. The rate of agitation is slowed down 10 minutes after addition of the urea to permit the suspended zinc dust to settle out, and the reaction mixture is maintained at 30-35° C. for 3 hours. This precondensation stage is followed by heating the reaction mixture and holding it at about 88° C. for 24 hours.

Reaction product prepared in this manner had a pH of 4.85 and a precipitation time of 29 seconds, having passed through a minimum precipitation time of about 24 seconds at a condensation reaction period of 18 hours. The aqueous resin solution formed by cooling the reaction product after 24 hours condensation period was neutralized with caustic soda solution to a pH of 7.2. Paper made from Kraft pulp treated with this resin solution in the manner described above had a wet tensile strength of 28 kg./gm. wt. The solution has a long storage life; more than 7 months, when stored at atmospheric temperatures.

The conditions for carrying out the processes of these examples are representative of preferred procedures for carrying out my invention. However, they may be varied within the limits heretofore described. For example, the formaldehyde solution and urea may be employed in other ratios than the 2.5:1 of the examples. Employing a mol ratio of formaldehyde to urea of 1.65:1, agitating the formaldehyde solution with zinc dust until its pH had increased from 3.2 to 6.1 before addition of the urea, and with the precondensation carried out at room temperature for 24 hours followed by heating the reaction mixture at 87° C. for 6 hours, resulted in a resin solution having a pH of 6.1. When this solution was employed in making paper by the procedure described above, the paper had a wet strength of 23 kg./gm. wt.

Example 4.—Into a vessel equipped with a stirrer and a reflux condenser, 750 parts of 35.5%, commercial methanol-free formaldehyde solution containing formic acid are charged. To it is added 0.32 part zinc dust, and the solution is strongly agitated by operating the stirrer at 700 R. P. M. until the pH increases from about 3.1 to about 6.0. There is then added 216 parts of solid urea, which is dissolved in the aqueous liquor in about 10 minutes. This corresponds to a ratio of about 2.5 mols formaldehyde for every 1 mol urea. When the urea has dissolved the agitation is slowed to 60 R. P. M. and the reaction mixture is stirred slowly while the vessel is heated to raise the temperature of the reaction mixture to above 30° C. during a period of about 25 minutes. The reaction mixture is then maintained at 30°–35° C. for three hours. Following this precondensation period the reaction mixture is heated to about 87°–89° C. and is maintained at those temperatures for six hours before cooling it to stop further condensation reactions. Reaction products thus prepared have a pH of about 5.0. They are neutralized to a pH of 7.2 by addition of a 2-N caustic soda solution and then heated and about 140 parts distilled off under atmospheric pressure at their boiling points of about 100° C. until they contain about 45% total solids (calculated as urea and formaldehyde). This distillation is completed within a two hour period. The concentrated products thus prepared have acidities of pH about 6.0–6.2. They are neutralized to pH 7.2 by addition of 2-N caustic soda solution.

Formaldehyde and urea were reacted by the procedure of this example, the formaldehyde being supplied in the form of 37% by weight aqueous solutions obtained from two different commercial sources. With increasing time for the condensation step of the process in which the reaction mixtures were heated at about 87°–89° C., the precipitation time for samples periodically taken decreased from 65 to 80 seconds at the end of one hour heating to 8 seconds at the end of 5 hours heating in one case and at the end of about 5½ hours heating in the other case. In both cases minimum precipitation times of about 3–4 seconds were reached at about 8 hours reaction time at the elevated temperatures. There was only a small increase in precipitation times during the ensuing 9 hours, so that at the end of 16 hours condensation reaction time the precipitation times were about 7–8 seconds.

By interrupting the condensation reaction step after six hours heating at 87°–89° C. the wet strengths imparted to paper by the resulting solutions were 26 and 28 kg./gm. wt. Product prepared from formaldehyde from one of the two sources after storing the concentrated solution without neutralization to age it for 4½ months (the solution having a pH of 6.2 after concentration), gave a paper having a wet strength of 53 kg./gm. wt. Product prepared from the formaldehyde derived from the second source, as initially prepared following the concentration to 45% solids, gave a paper having a wet strength of 28 kg./gm. wt. After one month aging without neutralizing the concentrated product (at a pH of 6.1), it imparted to the paper a wet strength of 40 kg./gm. wt. and after 3 months' aging a wet strength of 49 kg./gm. wt. When the acidity of the concentrated solution was neutralized to pH of 7.2, after one month storage of the neutralized solution it gave a paper having a wet strength of 30 kg./gm. wt. and after 3 months' storage (of the neutralized solution) it imparted to the paper a wet strength of 47 kg./gm. wt.

As shown by this example, when the acidity of products of my process is neutralized before they are stored at atmospheric temperatures, they impart increased wet strengths to paper as compared with the products as initially prepared; i. e., after the high temperature condensation step or after being further treated to evaporate water therefrom. After a sufficiently long storage period of the neutralized products, the wet strengths of papers prepared therefrom are about as great as of papers prepared from products which are aged for a much shorter period before their acidity is neutralized. The procedure described above for aging the acidic solutions is of particular importance, since it permits the manufacturer of the solutions to control the aging treatment so as to prepare a product which imparts high wet strengths to paper, which he may then neutralize and ship to the paper manufacturer while it still has a desirably long storage life after neutralization.

I claim:

1. The process for the production of a stable, aqueous solution of a urea-formaldehyde condensate selectively adsorbable from acidic aqueous solutions by cellulose fibers, which comprises (1) maintaining for a period of at least one hour at temperatures in the range 10° C. to 35° C. an aqueous solution initially containing formaldehyde and urea in the mol ratio of 1.65 to 3 mols formaldehyde for every 1 mol urea and an acidic buffer salt which maintains the hydrogen ion concentration of said solution within the range pH 4.5 to 6.9, said solution having been prepared by mixing the urea with the formaldehyde in an aqueous solution having a pH within the aforesaid range and being maintained at the aforesaid temperatures and hydrogen ion concentration for a period of time throughout which the reaction products of the urea and formaldehyde remain dissolved in the aqueous solution; (2) then heating the liquid product of step 1 to temperatures above 50° C. and maintaining it at those temperatures and at acidities in the range pH 4.5 to 6.5 to cause further condensation of the urea and formaldehyde; and (3) cooling the thus heated liquid reaction mixture to atmospheric temperatures and thus arresting the condensation reactions when the precipitation time of the hereindescribed reaction time test is substantially at its minimum value for said reaction mixture.

2. The process of claim 1 wherein the solution of urea-formaldehyde reaction product produced by step 3 is aged by storing it at atmospheric temperatures and a pH of 6.0 to 6.5 for a prolonged period of time and its acidity is then neutralized to a pH of 7.0 to 7.5 before the precipitation time of the thus aged solution by the hereindescribed reaction time test has decreased to below 10 seconds.

3. The process of claim 1 wherein the acidity of the solution of urea-formaldehyde reaction product produced by step 3 is neutralized to a pH of 7.0 to 7.5, the neutralized solution is boiled and water evaporated therefrom under atmospheric pressure, and the boiling of solution in which the pH has drifted downwardly to within the range of pH below 7.0 to 6.0 is limited to a period no longer than 2 hours.

4. The process of claim 1 wherein a minor proportion of methanol amounting to no less than about 2½% by weight is incorporated in the solution of urea-formaldehyde condensation product produced by step 3.

5. The process for the production of a stable, aqueous solution of a urea-formaldehyde condensate selectively adsorbable from acidic aqueous solution by cellulose fibers, which comprises (1) maintaining for a period of at least one hour and not substantially exceeding 24 hours at temperatures in the range 10° C. to 35° C. an aqueous solution initially containing formaldehyde and urea in the mol ratio of 2 to 3 mols formaldehyde for every 1 mol urea and an acidic buffer salt which maintains the hydrogen ion concentration of said solution within the range pH 4.5 to 6.9, said solution having been prepared by mixing the urea with the formaldehyde in an aqueous solution having a pH within the aforesaid range; (2) then heating the liquid product of step 1 to temperatures of about 85° C. to about 100° C. and maintaining it at those temperatures and at acidities in the range pH 4.5 to 6.5 to cause further condensation of the urea and formaldehyde; and (3) cooling the thus heated liquid reaction mixture to atmospheric temperatures and thus arresting the condensation reactions when the precipitation time of the hereindescribed reaction time test is substantially at its minimum value for said reaction mixture.

6. The process for the production of a stable, aqueous solution of a urea-formaldehyde condensate selectively adsorbable from acidic aqueous solution by cellulose fibers, which comprises (1) mixing with an aqueous formaldehyde solution containing at least 0.03% free formic acid, zinc dust in amount in excess of that required to form zinc formate with the free formic acid present, agitating the mixture of solution and zinc dust until the zinc has reacted with a substantial proportion of the formic acid and the pH of the solution is above 4.5; (2) thereafter adding to and dispersing in the formaldehyde solution urea in amount providing 1 mol of urea for every 1.65 to 3 mols formaldehyde present, promptly after dispersal of the urea in the formaldehyde solution and within 10 minutes of the initial addition of the urea to the solution, separating out from suspension in the solution undissolved zinc suspended therein; (3) maintaining the thus prepared reaction mixture for a period of at least one hour and not substantially exceeding 24 hours at temperatures in the range 10° C. to 35° C. and at hydrogen ion concentrations in the range pH 4.5 to 6.9; (4) then heating the liquid product of step 3 to temperatures above 50° C. and maintaining it at those temperatures and at acidities in the range pH 4.5 to 6.5 to cause further condensation of the urea and formaldehyde; and (5) cooling the thus heated liquid reaction mixture to atmospheric temperatures and thus arresting the condensation reactions when the precipitation time of the hereindescribed reaction time test is substantially at its minimum value for said reaction mixture.

7. The process of claim 6 wherein in step 1 the zinc is maintained suspended in the formaldehyde solution until the pH of the solution is about 6.0 to 6.5 before addition thereto of urea and in step 2 separating out undissolved zinc from suspension in the solution by permitting the zinc to settle out without withdrawing it from contact with the solution and carrying out steps 3 and 4 with the zinc in contact with the solution but not suspended therein.

8. The process of claim 6 wherein 1 mol of urea for every 2 to 3 mols of formaldehyde are added in step 2, and in step 4 the liquid product of step 3 is heated to temperatures of about 85° C. to about 100° C. and is maintained at those temperatures and at acidities in the range pH 4.5 to 6.5 to cause further condensation of the urea and formaldehyde.

9. A stable, aqueous solution of a urea-formaldehyde condensation product selectively adsorbable from acidic aqueous solution by cellulose fibers, which condensation product has been produced by the process of claim 1.

10. A stable, aqueous solution of a urea-formaldehyde condensation product selectively adsorbable from acidic aqueous solution by cellulose fibers which condensation product has been produced by the process of claim 5.

11. A stable, aqueous solution of a urea-formaldehyde condensation product selectively adsorbable from acidic aqueous solution by cellulose fibers, which condensation product has been produced by the process of claim 6.

HARRY E. GRONICH.

REFERENCES CITED

The following references are of record in the file of this patent:

UNITED STATES PATENTS

| Number | Name | Date |
|---|---|---|
| 2,004,970 | Armenault | June 18, 1935 |
| 2,101,534 | Edgar | Dec. 7, 1937 |
| 2,338,602 | Schur | Jan. 4, 1944 |
| 2,407,376 | Maxwell | Sept. 10, 1946 |
| 2,492,702 | Neubert et al. | Dec. 27, 1949 |
| 2,559,220 | Maxwell et al. | July 3, 1951 |

FOREIGN PATENTS

| Number | Country | Date |
|---|---|---|
| 467,505 | Canada | Aug. 22, 1950 |
| 523,185 | Great Britain | July 8, 1940 |